(12) United States Patent
Tabet

(10) Patent No.: US 8,141,224 B2
(45) Date of Patent: Mar. 27, 2012

(54) PATCH PANEL LABELLING SYSTEM

(75) Inventor: Edouard Tabet, Brossard (CA)

(73) Assignee: Belden CDT (Canada) Inc., Saint-Laurent (CA)

( * ) Notice: Subject to any disclaimer, the term of this patent is extended or adjusted under 35 U.S.C. 154(b) by 696 days.

(21) Appl. No.: 12/352,294

(22) Filed: Jan. 12, 2009

(65) Prior Publication Data

US 2009/0194226 A1  Aug. 6, 2009

Related U.S. Application Data

(60) Provisional application No. 61/020,550, filed on Jan. 11, 2008.

(51) Int. Cl.
  *B23P 11/00* (2006.01)
  *B32B 37/10* (2006.01)
(52) U.S. Cl. .......................... 29/434; 156/230
(58) Field of Classification Search .................... 29/434, 29/428; 156/230, 391
See application file for complete search history.

(56) References Cited

U.S. PATENT DOCUMENTS

| | | | |
|---|---|---|---|
| 5,613,874 A | 3/1997 | Orlando et al. | |
| 5,735,708 A | 4/1998 | Arnett et al. | |
| 5,977,481 A | 11/1999 | Worrell et al. | |
| 6,053,764 A | 4/2000 | Curry et al. | |
| 6,347,715 B1 | 2/2002 | Drozdenko et al. | |
| 6,421,941 B1 | 7/2002 | Finke et al. | |
| 7,336,505 B2 | 2/2008 | Campini et al. | |
| 7,353,629 B2 | 4/2008 | Caveney et al. | |
| 2010/0068923 A1* | 3/2010 | Tabet | 439/540.1 |

FOREIGN PATENT DOCUMENTS

WO  WO 2007/127306 A2  11/2007
WO  WO 2008/074013 A2  6/2008

* cited by examiner

*Primary Examiner* — John C Hong
(74) *Attorney, Agent, or Firm* — Goudreau Gage Dubuc; Hugh Mansfield

(57) ABSTRACT

The present invention provides a patch panel labelling system for mounting to a telecommunications rack. The system comprises a connector module mounted to the rack and having a front face with a plurality of connectors. A labelling plate is mounted to the module for movement about a first pivot axis between a first position where the plate is substantially parallel to the front face of the module and a second position where the plate is pivoted away from the front face for providing access to the connectors. The plate can be further pivoted about a second pivot axis to selectively hide or reveal the labels provided thereon for identifying the connectors. The plate can be also be slid underneath the module for storage.

21 Claims, 9 Drawing Sheets

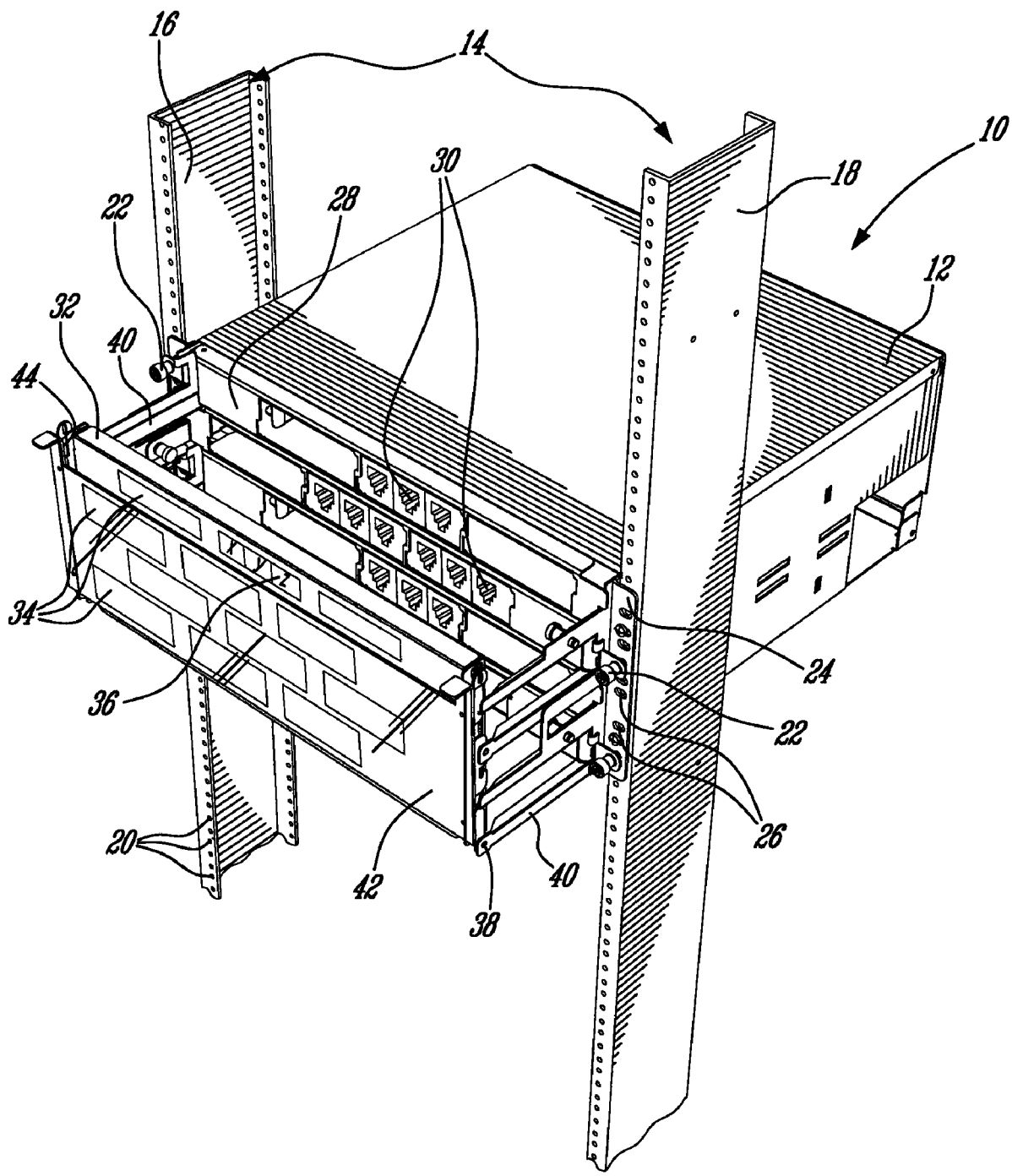
FIG_1

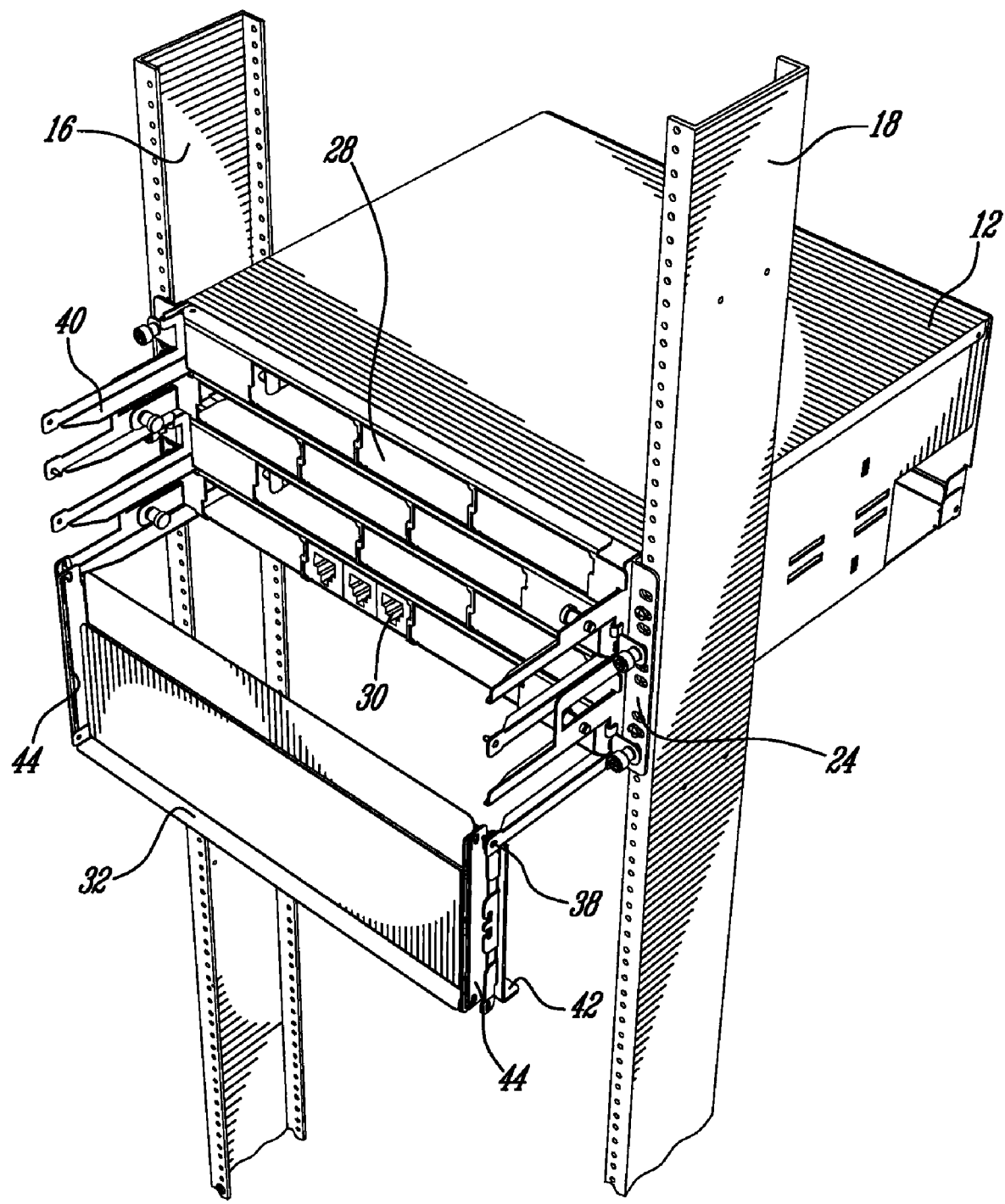
FIG_2

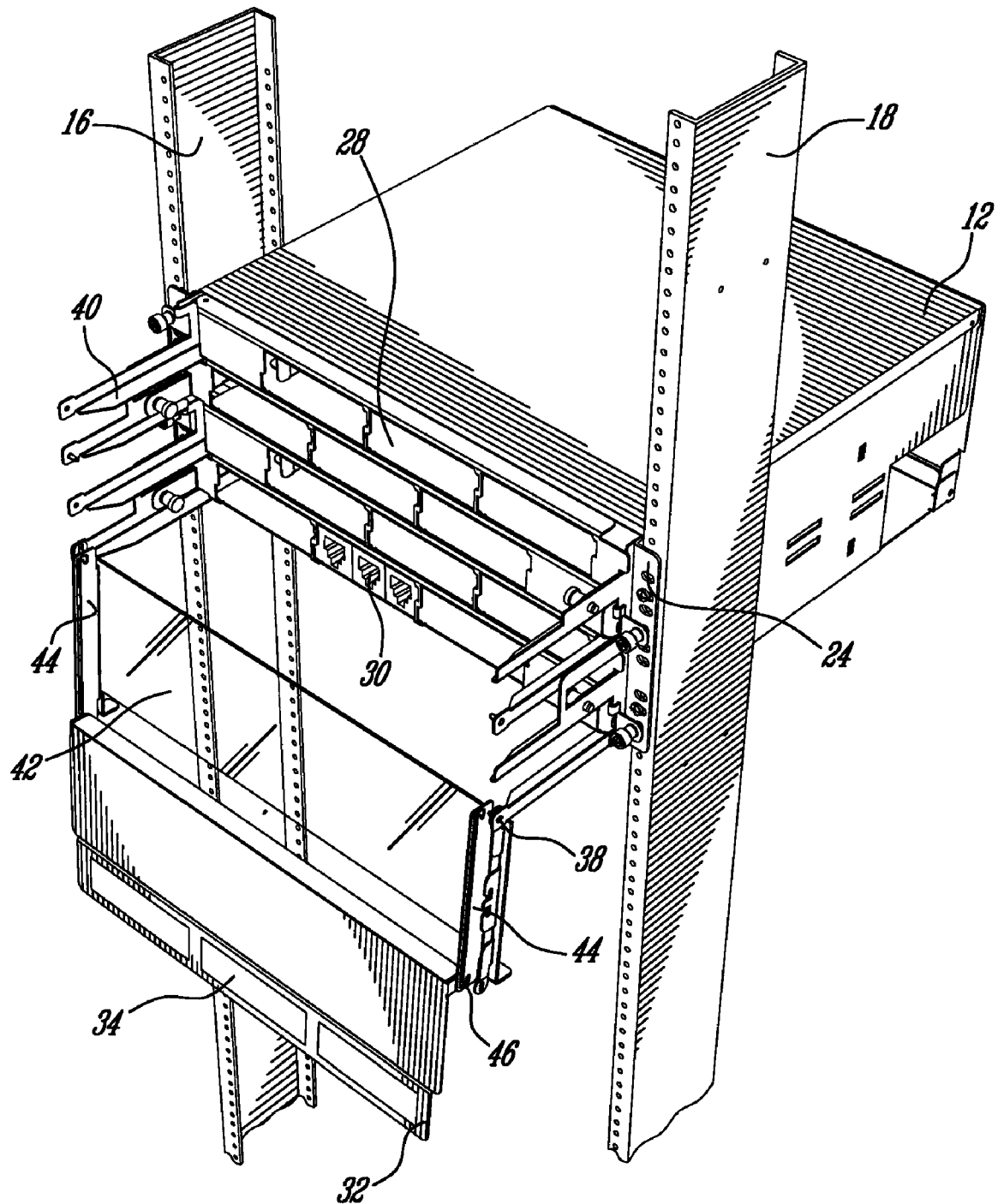
FIG_3A

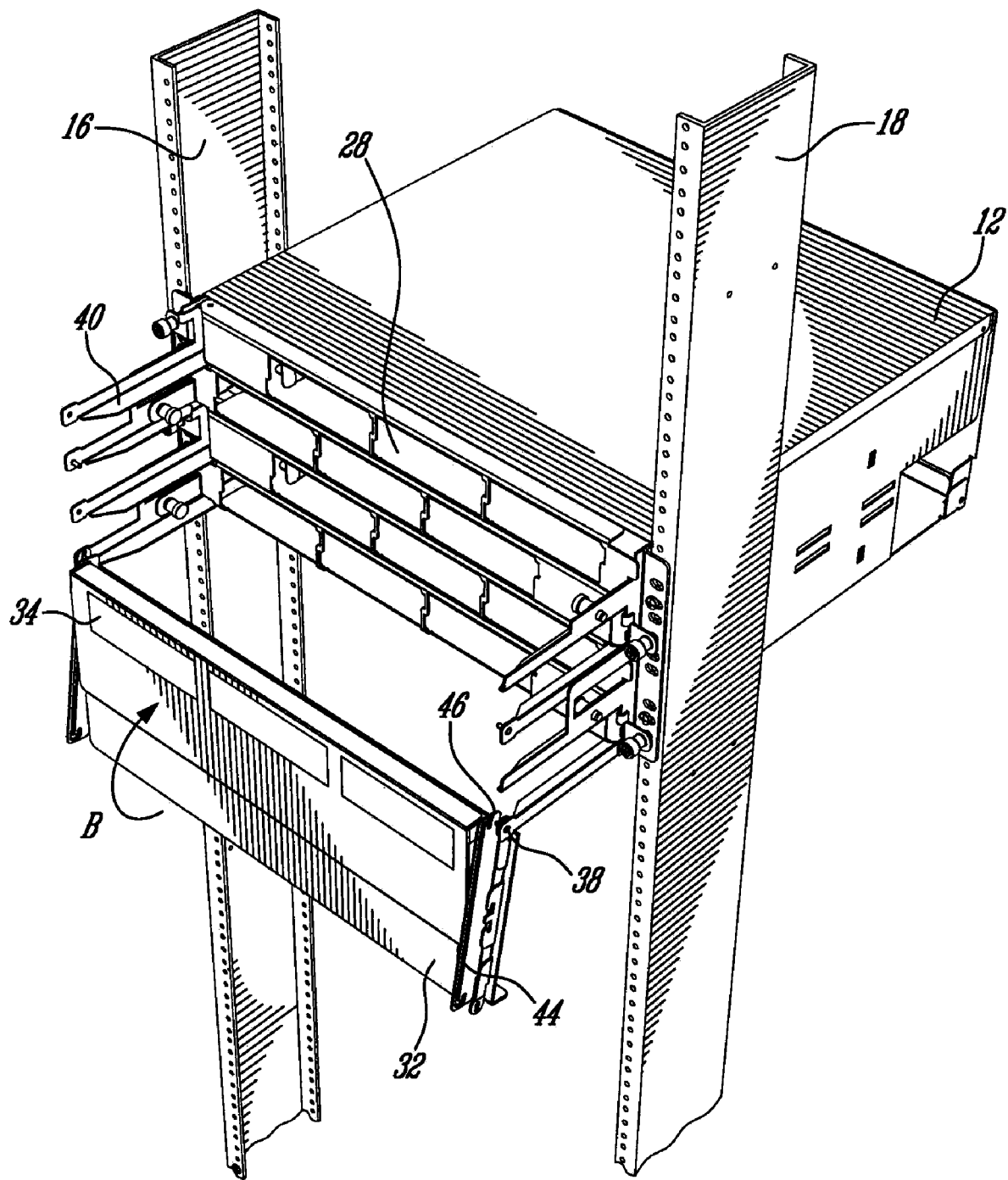
FIG_4A

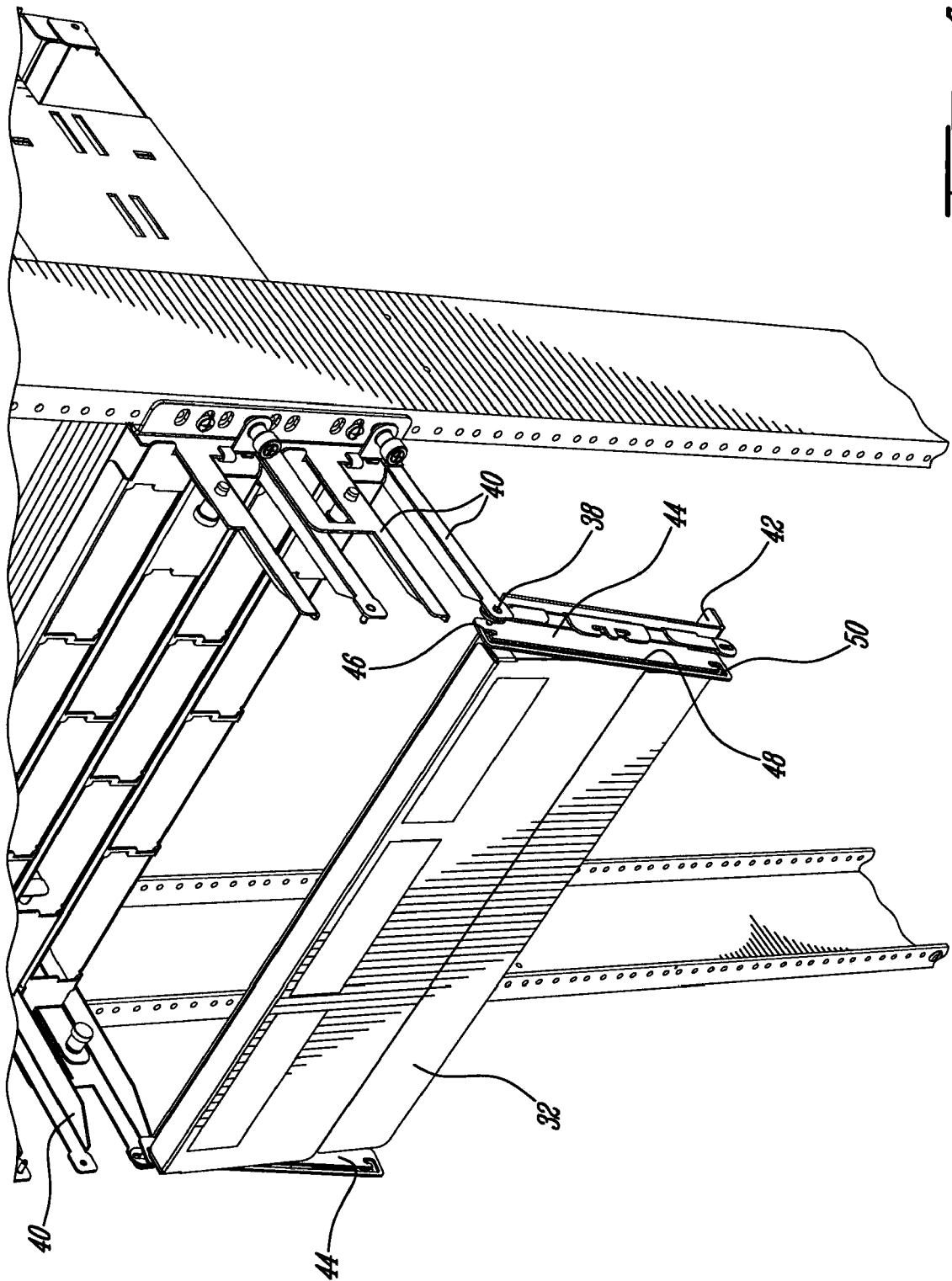

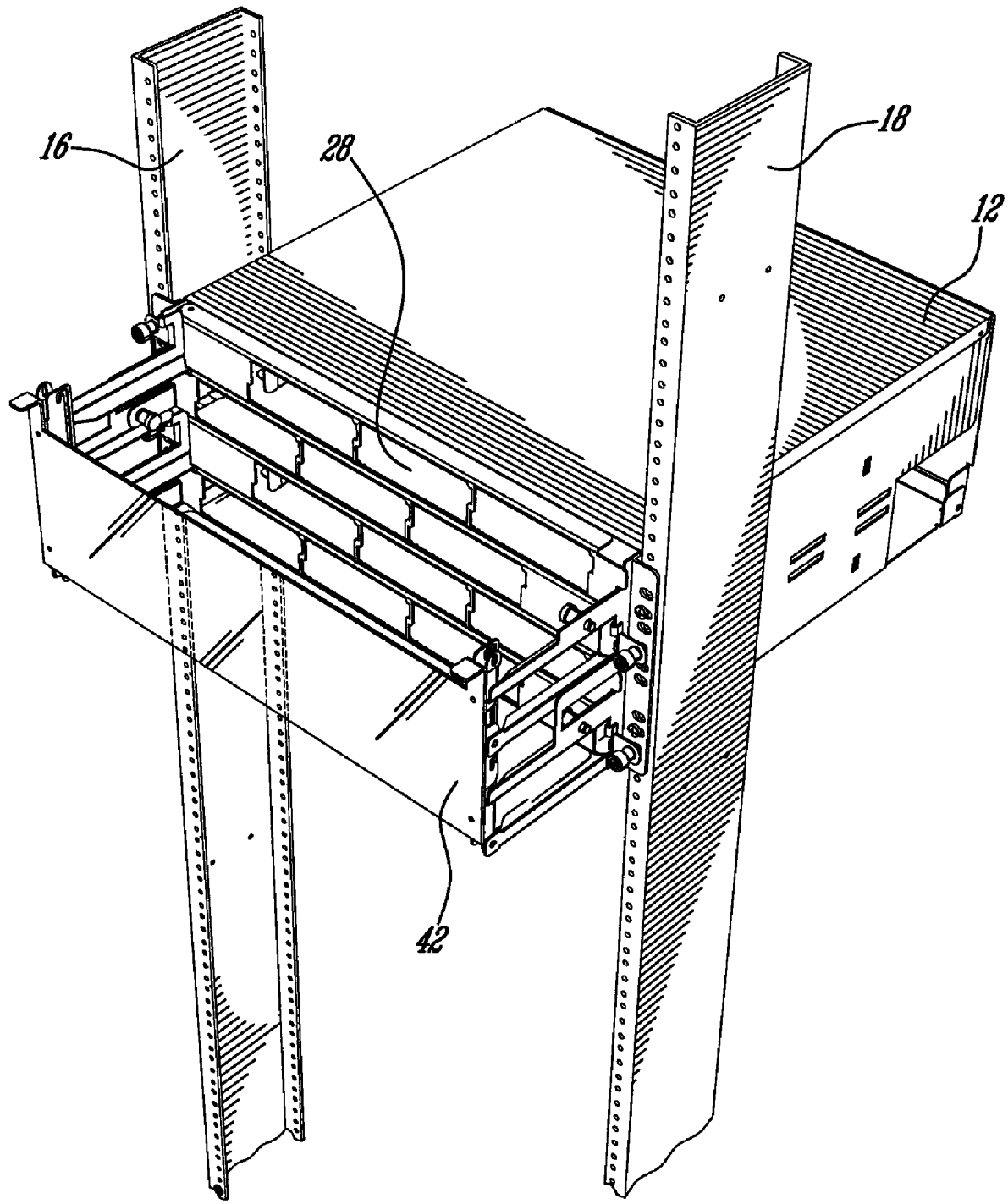
FIG_7

PATCH PANEL LABELLING SYSTEM

CROSS REFERENCE TO RELATED APPLICATIONS

This application claims priority to U.S. Provisional Application No. 61/020,550, filed on Jan. 11, 2008, and to Canadian Application No. 2,617,853, also filed on Jan. 11, 2008, both of which are herein incorporated by reference in their entirety for all purposes.

FIELD OF THE INVENTION

The present invention relates to a patch panel labelling system.

BACKGROUND OF THE INVENTION

As patch panels are increasingly used and typically accommodate a large number of interconnections between telecommunications equipment, appropriate identification of ports is highly desirable in order to maintain a properly configured system. Labelling of such equipment is defined by standards, such as the Administration Standard for Commercial Telecommunications Infrastructure (ANSI/TIA/EIA-606-A), which requires the labels to be visible during the installation and normal maintenance of the infrastructure. The labels should also be resistant to the environmental conditions at the point of installation (e.g. moisture, heat, or ultraviolet light) and have a design life equal to or greater than that of the labelled component. In addition, it is desirable for all labels to be printed or generated by a mechanical device and not written by hand.

Prior art labelling techniques typically use rudimentary adhesive stickers applied in the vicinity of a port being identified. Such labelling has the disadvantage of providing no protection for the surface onto which identification information is inscribed, resulting in inadvertent smudging thereof during application or cleaning. The adhesive quality of the sticker may also deteriorate and the sticker may be lost, especially when the panel is exposed to heat or humidity.

Other labelling techniques provide a recess in the patch panel frame to accommodate a label typically covered with a clear plastic shield for protection. Snap-in strips may also be attached to the front of a faceplate mounted to the patch panel. However, such methods make insertion of new labels for any revision process difficult as the recesses or the faceplates are typically disposed in a location with restricted physical access.

The prior art further teaches the use of labelling plates, on which identification indicia is printed, placed adjacent the front face of the rack for identifying ports. However, a drawback of these methods is that they do not allow for the labelling to remain visible at any time during installation of and maintenance of the system. Also, as they typically cannot be easily displaced and stored when not needed, they can make access to the ports difficult.

What is therefore needed, and what is an object of the present invention, is an improved labelling system, which allows for the labelling to be easily displaced and/or stored when access to the front face of the rack-mounted equipment is desired as well as remain visible at any time during installation and maintenance, as desired.

SUMMARY OF THE INVENTION

To address the above and other drawbacks, there is provided in accordance with the present invention a patch panel labelling system for mounting to a telecommunications rack comprising a pair of spaced vertical rails and a connector module mounted between the vertical rails, the module comprising a front face lying in a first plane and a plurality of connectors arranged along the front face for each terminating a cable. The labelling system comprises a pair of sliders attached at opposite sides of the module adjacent the rails, the pair of sliders extending away from the front face along a second plane intersecting the first plane along a substantially horizontal axis.

The labeling system further comprises a labelling plate mounted to the rack in front of the module and attached to free ends of the pair of sliders, the plate comprising a planar labelling surface and a plurality of labels on the labelling surface. Each of the plurality of labels identifies at least one of the plurality of connectors.

The labelling plate is moveable about a first substantially horizontal pivot axis between a first position wherein the plate is opposite the front face, the labelling surface facing away from the plurality of connectors and substantially parallel to the first plane and each of the plurality of labels is opposite the at least one of the plurality of connectors and a second position where the plate is pivoted away from the front face and lies in the second plane thereby providing access to the plurality of connectors. The plate is further moveable from the second position to a third position where the plate is slid along the pair of sliders towards the front face.

In accordance with the present invention, there is also provided a method for labelling a patch panel mounted to a telecommunications rack comprising a pair of spaced vertical rails. The method comprises providing a connector module mounted between the vertical rails, the module comprising a front face lying in a first plane and a plurality of connectors arranged along the front face for each terminating a cable.

The method further comprises providing a pair of sliders attached at opposite sides of the module adjacent the rails, the pair of sliders extending away from the front face along a second plane intersecting the first plane along a substantially horizontal axis. The method also comprises providing a labelling plate comprising a planar labelling surface and a plurality of labels on the labelling surface, each of the plurality of labels identifying at least one of the plurality of connectors.

The method also comprises mounting the labelling plate to free ends of the pair of slider in front of the module and moving the labelling plate about a first substantially horizontal pivot axis between a first position wherein the plate is opposite the front face, the labelling surface facing away from the plurality of connectors and substantially parallel to the first plane and each of the plurality of labels is opposite the at least one of the plurality of connectors and a second position where the plate is pivoted away from the front face and lies in the second plane thereby providing access to the plurality of connectors. The method further comprises moving the plate from the second position to a third position where the plate is slid along the pair of sliders towards the front face.

BRIEF DESCRIPTION OF THE DRAWINGS

FIG. 1 is a perspective view of a patch panel assembly in accordance with an illustrative embodiment of the present invention;

FIG. 2 is a perspective view of a labelling plate in a first position in accordance with an illustrative embodiment of the present invention;

FIG. 3A is a perspective view of a labelling plate in a second position in accordance with an illustrative embodiment of the present invention;

FIG. 4A is a perspective view of a labelling plate in a third position in accordance with an illustrative embodiment of the present invention;

FIG. 4B is a detailed perspective view of a labelling plate in the third position of FIG. 4A in accordance with an illustrative embodiment of the present invention;

FIG. 7 is a perspective view of a stored labelling plate in accordance with an illustrative embodiment of the present invention.

DESCRIPTION OF ILLUSTRATIVE EMBODIMENTS

Figure 3B:
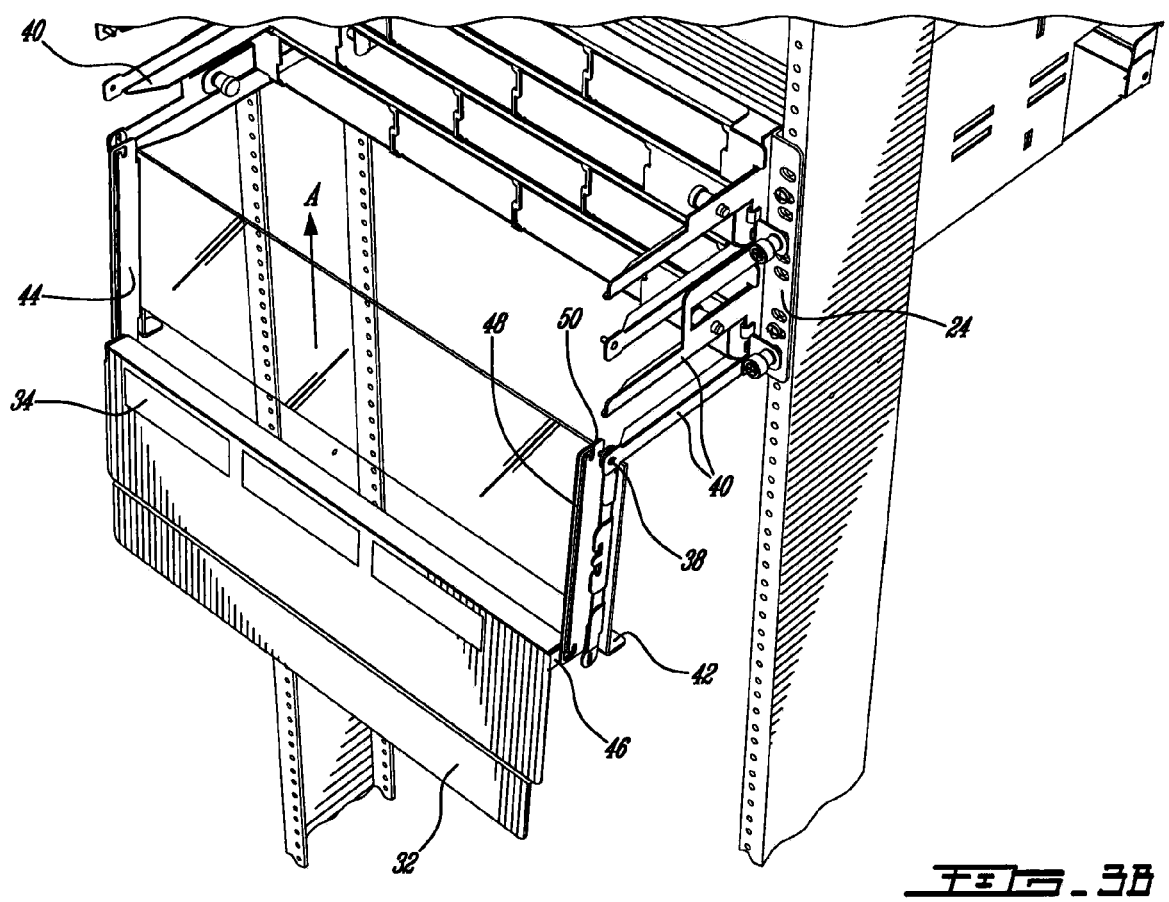
FIG. 3B is a detailed perspective view of a labelling plate in the second position of FIG. 3A in accordance with an illustrative embodiment of the present invention.

The present invention is illustrated in further details by the following non-limiting examples.

Referring now to FIG. 1, a patch panel assembly, generally referred to using the reference numeral 10, will now be described. The assembly 10 comprises a telecommunications device 12 illustratively mounted to a standard network rack 14 comprising two spaced vertical side rails 16 and 18. Each side rail 16 and 18 comprises a plurality of mounting apertures as in 20 for mounting the device 12 via fasteners as in 22, such as screws, nuts, bolts, and the like.

For this purpose, the device 12 comprises at each side thereof a pair of mounting plates as in 24 having mounting apertures 26 formed therein and adapted to mate with the apertures as in 20 of each side rail 16 and 18 of the rack 14 for attachment thereto. The device 12 illustratively further comprises a chassis frame having at a front face thereof an opening adapted to receive a plurality of sub-modules as in 28. For sake of clarity and illustration, only four (4) sub-modules as in 28 are illustrated in FIG. 1, although it will be apparent to a person skilled in the art that the chassis frame may be sized to receive more or less sub-modules as in 28 as required.

Still referring to FIG. 1, the front face of each sub-module 28 has a plurality of connectors as in 30 mounted therein for connection to communication elements (not shown) such as cables, patch cords, and the like, dressed on the front side of the network rack 14. Each connector 30 is illustratively provided with a receptacle (i.e. a connector jack or port, not shown) adapted for receiving therein a cable terminated by a modular plug, a fiber optic connector, or the like. The cable may alternatively be terminated by a connection, such as an Insulation Displacement Connector (IDC), not shown, provided at the connector 30. In order to provide for identification of the connectors as in 30 of each sub-module 28, a patch panel identification system comprising a planar labelling plate or card 32 is illustratively mounted to the patch panel 10.

For this purpose, the labelling plate 32 is positioned adjacent the front face of the sub-modules as in 28. The labelling plate 32 comprises a labelling surface (not shown) adapted to receive therein a plurality of labels or identifications as in 34 for identifying each connector 30 of a given sub-module 28 (for example, for recording port assignments or serial numbers or the like) using indicia 36 such as icons, alphanumeric codes, colours, and the like, thus facilitating installation and maintenance of the system. Illustratively, the labels as in 34 are arranged linearly in an array that matches the array of connectors as in 30 disposed at the front face of the device 12. Thus, each connector 30 is associated with a respective label 34. Alternatively, instead of matching each label 34 with a corresponding connector 30, a given label 34 may be associated with a plurality of connectors as in 30 grouped according to their type, function, or the like.

As will now be apparent to a person skilled in the art, the labelling plate 32 may be fabricated from any suitable material, such as a heavy card, moulded plastic or plastic laminated paper or the like, having sufficient rigidity to enable movement thereof as well as adequate resistance to the environmental conditions at the point of installation. The labels as in 34 may comprise identification printed directly on the plate 32 (e.g. written by hand or printed).

Alternatively, the labels as in 34 can be attached to the plate 32 (for example, using a suitable adhesive), in which case they may illustratively be fabricated from a wide variety of paper, plastic, fabric or other suitable materials onto which identification information may be inscribed. In some embodiments, the labels as in 34 may be inserted into openings or compartments (not shown) formed into the labelling plate 32, in which case it is desirable for the labels as in 34 to be slightly flexible so as to facilitate insertion.

Still referring to FIG. 1, each side of the labelling plate 32 is illustratively mounted to the patch panel 10 via a pivot connection or hinge 38 mounted to one of a plurality of fingers as in 40 fixedly attached to the mounting plates 24 to serve as side cable management for the cables (not shown) inserted into the connectors as in 30. It should be noted that although, for illustrative purposes, a pair of hinges as in 38 (with a single hinge 38 visible in FIG. 1) have been provided for mounting the labelling plate 32 to the patch panel 10, another type of pivot connection such as a pair of springs, a resilient pliable material, or even a fold in the labelling plate 32 may be similarly provided without departing from the scope of the present invention.

Illustratively, a pair of fingers as in 40 is positioned at opposite sides of each sub-module 28 and the pair of fingers as in 40 to which the pair of hinges as in 38 is mounted further serves as sliders for enabling the labelling plate 32 to be moved out of the installer's way and further stored underneath the corresponding sub-module 28 if desired, as will be discussed further herein below.

For this purpose, each finger 40 extends away from the front face of the sub-module 28 along a plane spanned by a bottom surface of the sub-module 28, this plane being preferably substantially perpendicular (although could be at another suitable angle) to a vertical plane spanned by the rails 16 and 18. In particular, the fingers as in 40 project away from the front face of the sub-module 28 by a distance (not shown) sufficient to accommodate the cables connected to the sub-module 28, thus preventing damage to the cables as sufficient room is provided therefor.

Still referring to FIG. 1, the labelling plate 32 is illustratively provided with a transparent protective shield 42, to which the labelling plate 32 via a pair of guide rails 44 attached to each side thereof. When the plate 32 and shield 42 are in the closed position illustrated in FIG. 1, the shield 42 is opposite the front face of the sub-module 28 and substantially parallel to the vertical plane of the rails 16 and 18. Each one of the labels as in 34 is then opposite a corresponding one of the connectors or groups of connectors as in 30. The shield 42 is preferably made of either transparent or translucent material (e.g. transparent plastic, such as PVC or polycarbonate or the like) so that identification information printed, written or otherwise inscribed upon the labels 34 of the labelling plate 32 will remain visible through the protective shield 42. The shield 42 can also comprise any other non-transparent or translucent material of sufficient rigidity, such as mesh or the like, which provides for viewing of the labels 34 when the shield 42 is positioned in front of the labelling plate 32.

Referring now to FIG. 2, when access to the connectors 30 is desired (e.g. for any rework or additional connections), the shield 42 and associated labelling plate 32 are illustratively pivoted forward by about 180 degrees (or less if desired) about a pivot axis (not shown) provided by the pair of hinges as in 38, thus revealing the front face of the sub-modules 28 and allowing access to the associated connectors 30. In this position, the labels as in 34 face the rear of the side rails 16 and 18 and are therefore not visible to the operator.

Referring now to FIG. 3A, FIG. 3B, FIG. 4A, and FIG. 4B, in order for the labels 34 associated with the connectors 30 of the sub-modules as in 28 to be visible during installation and normal maintenance, as required by telecommunication standards, the present invention allows for the plate 32 to be pivoted from the position shown in FIG. 2 to that of FIG. 3A and FIG. 4A. For this purpose, the labelling plate 32 is rotated by about 180 degrees about a pivot axis of a second pivot connection, e.g. a pivot pin 46 or the like, attached to each guide rail 44, thus reversing the front-to-back orientation of the labelling plate 32 and revealing the labels 34 attached thereto. In order to secure the labelling plate 32 and adjust a positioning thereof relative to the sub-modules as in 28 by for example bringing the labelling plate 32 closer to the operator's field of view, the labelling plate 32 subsequently slides up in the direction of arrow A towards the hinge 38 along the guide rails 44. The guide rails 44 are illustratively each provided with a longitudinal slot 48 which is adapted to receive the respective pivot pin 46, and which extends the entire length of each of each guide rail 44. At each end of the slot 48, a generally L-shaped notch 50 may be optionally provided to better retain the pivot pin 46 in position at either extremity of the rails 44. In this embodiment, the labelling plate 32 is thus slid upwards by sliding the pivot pins as in 46 linearly within their respective slot 48 of the guide rail 44 until the pivot pin 46 reaches the upper notch 50 of the slot 48 (see FIG. 4B), thus securing the plate 32 in place substantially parallel to the plane of the vertical rails (the labelling plate 32 having been pivoted by 180 degrees about the hinges as in 38, as discussed herein above) with the shield 42 behind the plate 32. The operator's work is thus made easier as it becomes possible to view and associate each label as in 34 with the corresponding connectors or groups of connectors as in 30 being worked on without the labelling plate 32 impeding access thereto.

Still referring to FIG. 4A, once the installer's work is done, the shield 42 and associated labelling plate 32 may be pivoted in the direction B by about 180 degrees about the hinge 38. In this manner, the patch panel assembly 10 moves from the position shown in FIG. 4A to a position (not shown), in which the labelling plate 32 and shield 42 are both substantially parallel to the vertical plane of the rails 16 and 18, with the labels as in 34 facing away from the installer (i.e. labelling plate 32 in a reversed orientation from the one illustrated in FIG. 1). In this manner, the labels as in 34 are no longer visible (e.g. hidden for security purposes) while the front face of the sub-modules 28 is protected by the shield 42.

Figure 5:
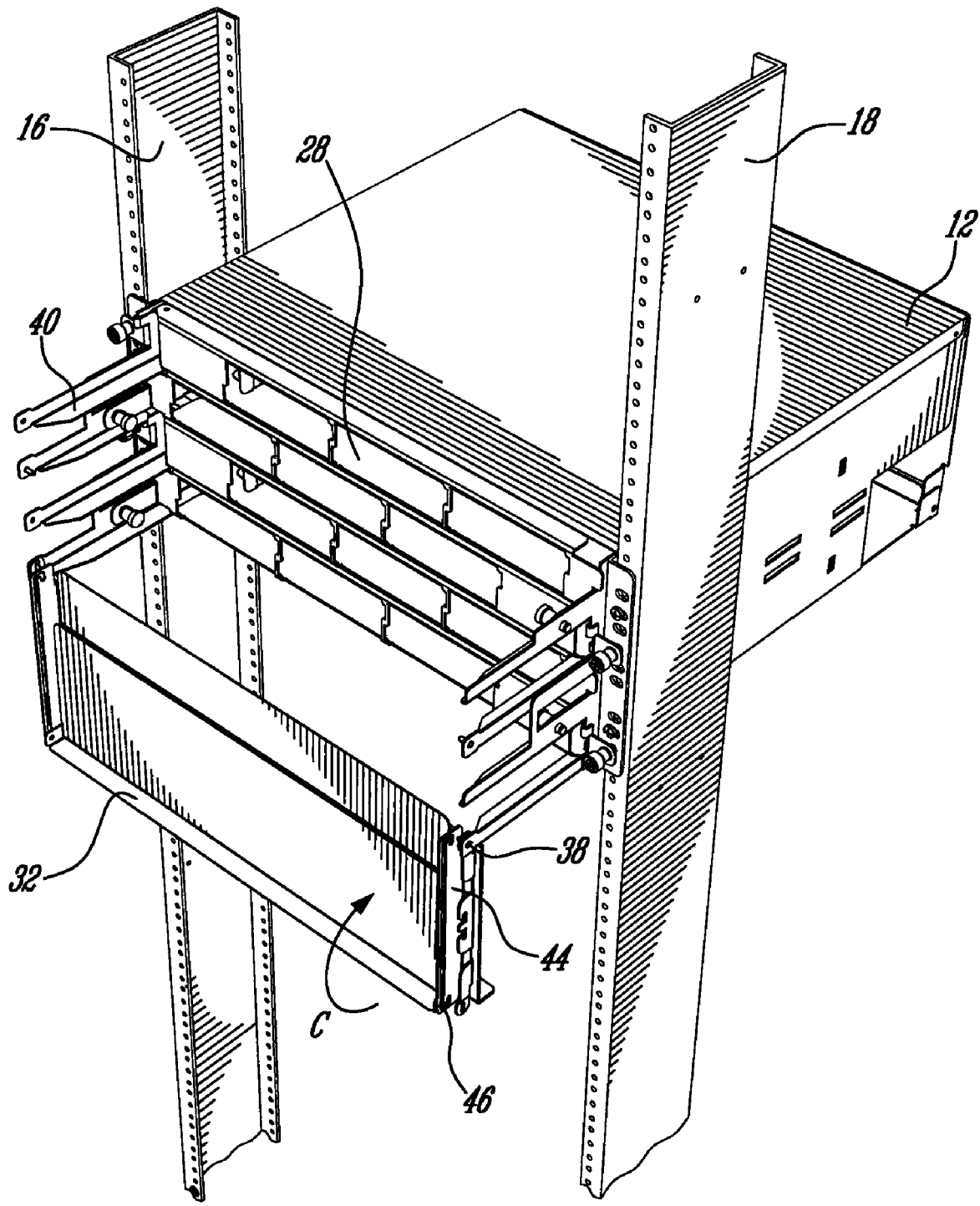
FIG. 5 is a perspective view of a labelling plate in a fourth position in accordance with an illustrative embodiment of the present invention.

Referring now to FIG. 5 in addition to FIG. 4A and FIG. 4B, when it is desired to move the labelling plate 32 out of the installer's way or alternatively store the labelling plate 32, the operator can advantageously move the labelling plate 32 from the position illustrated in FIG. 4B by swinging the labelling plate 32 forward about 180 degrees about the pivot pins as in 46 while at the same time sliding the labelling plate 32 back downwards along the slots 48 of the guide rails 44. In this manner, the labelling plate 32 reaches the position illustrated in FIG. 5, in which the pivot pins as in 46 are optionally retained in the bottom notch 50 (for increased structural rigidity) and the labelling plate 32 abuts against the shield 42. In this position, the orientation of the labelling plate 32 is reversed and the labels 34 face away from the installer.

Still referring to FIG. 5 in addition to FIG. 4A and FIG. 4B, in order to move the labelling plate 32 out of the installer's way or store the labelling plate 32, the shield 42 and the labelling plate 32 are subsequently pivoted in the direction C about the hinges as in 38 by about 90 degrees until the labelling plate 32/shield 42 lie in the plane of the pair of fingers as in 40 the hinges as in 38 are mounted to (illustratively the bottom ones of the fingers 40 shown in FIG. 5).

As mentioned herein above, the plane of the bottom fingers 40, i.e. the sliders, is the plane spanned by the bottom surface of the sub-module 28 and the plate 32 is thus positioned so as not to impede the installers movement (as well as to enable subsequent storage of the plate 32 if desired) by sliding the pivot pins as in 46 along the guide rails 44 and then along the bottom fingers as in 40. In particular, the length of the bottom fingers as in 40 is chosen so that the labelling plate 32 can rest on the fingers as in 40 and be held by the latter (in a manner similar to a tray). The shield 42 can then be further pivoted about the hinges as in 38 so as to fully unobstruct the installer's access to the front face of the sub-modules as in 28 and thus simplify the work.

Still referring to FIG. 5 in addition to FIG. 4A and FIG. 4B, the labelling plate 32 need not be moved to the position illustrated in FIG. 5 prior to being positioned in the plane of the pair of fingers as in 40. Instead, from the position illustrated in FIG. 4A, i.e. a position where the labels 34 still face towards the installer, the shield 42 and labelling plate 32 could simply pivoted by about 90 degrees about the hinges as in 38 in the direction B. The labelling plate 32 then lies in the plane of the bottom fingers as in 40 and can be slid therealong to provide more space to the installer, as discussed herein above. In this position, the labelling surface of the labelling plate 32 advantageously remains visible to the installer while the labelling plate 32 rests on the fingers as in 40, thus enabling the installer to carry on the work without the labelling plate 32 being in the way.

Figure 6:
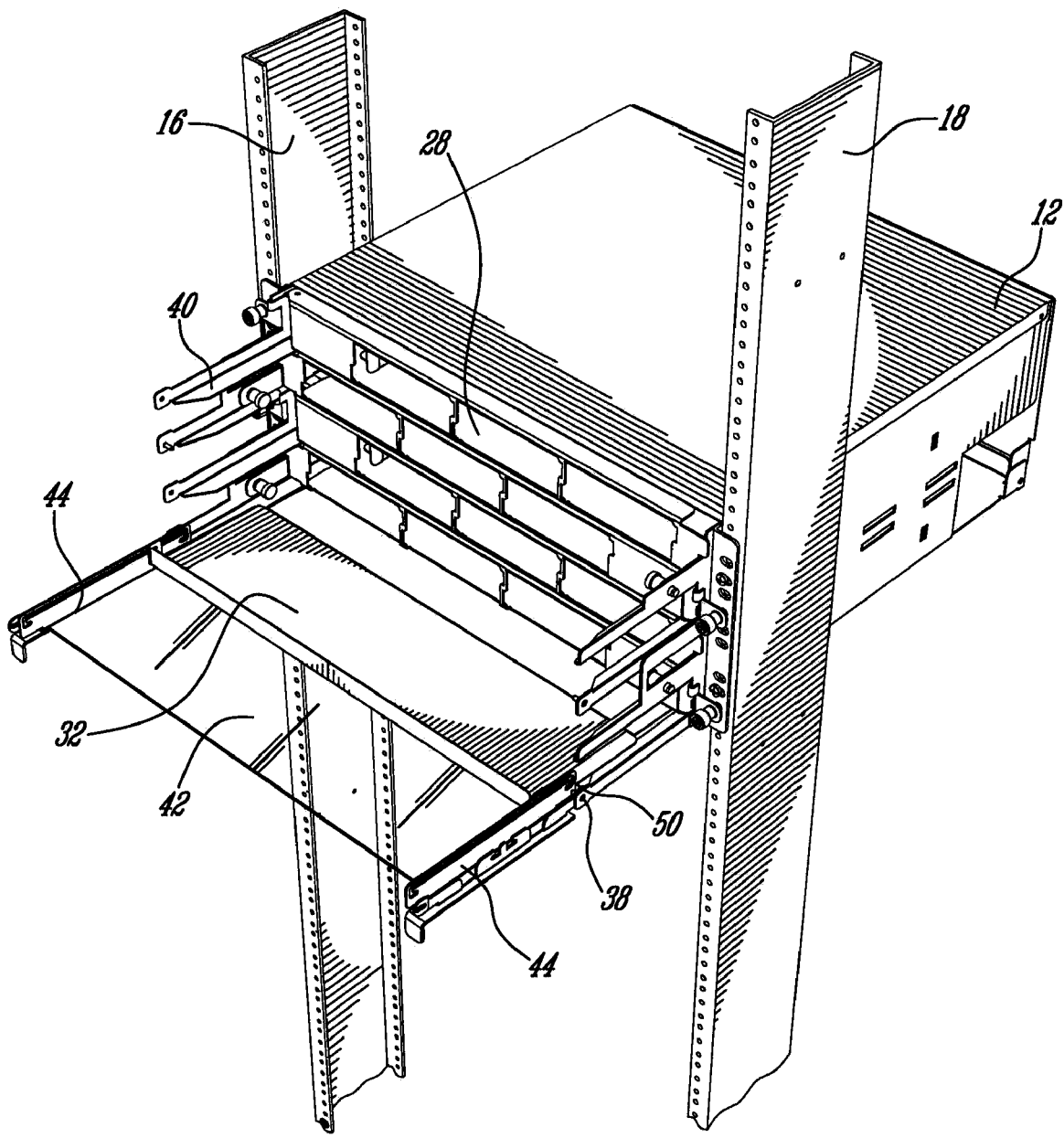
FIG. 6 is a perspective view of a labelling plate being stored in accordance with an illustrative embodiment of the present invention.

Referring now to FIG. 6, the plate 32 may also be further slid along the bottom fingers 40 for storage underneath the sub-module 28, if desired (e.g. when no labelling is desired or necessary). For this purpose, the cables (not shown) received in the connectors 30 are preferably routed towards the side of the sub-module 28 instead of towards the bottom surface thereof, thus preventing obstruction during the sliding of the plate 32 underneath the sub-module 28.

Referring now to FIG. 7, once installation or maintenance is complete and the plate 32 is stored, the shield 42 may then be pivoted about the hinges 38 until it is in a position substantially parallel to the vertical plane of the rails 16 and 18. In this manner, the shield 42 illustratively protects the front face of the sub-modules 28 while still allowing the front face to be viewed. The labelling plate 32 can be easily retrieved from storage by hinging the shield 42 open and sliding the plate 32 out from underneath the sub-module 28 to bring the labelling plate 32 back to the position illustrated in FIG. 1 or any other deployed position, as desired.

As will now be apparent to a person skilled in the art, although the labelling plate 32 has been illustrated as being attached to the bottom fingers as in 40 for storage underneath the lower sub-module 28, it may also be stored underneath any other of the sub-modules 28 (and accordingly the labelling plate 32 may be attached to the first or second pair of fingers as in 40) provided there is sufficient space to slide the plate 32 underneath.

Although the present invention has been described hereinabove by way of specific embodiments thereof, it can be modified, without departing from the spirit and nature of the subject invention as defined in the appended claims.

I claim:

1. A patch panel labelling system for mounting to a telecommunications rack comprising a pair of spaced vertical rails and a connector module mounted between the vertical rails, the module comprising a front face lying in a first plane and a plurality of connectors arranged along the front face for each terminating a cable, the labelling system comprising:
   a pair of sliders attached at opposite sides of the module adjacent the rails, said pair of sliders extending away from the front face along a second plane intersecting the first plane along a substantially horizontal axis;
   a labelling plate mounted to the rack in front of the module and attached to free ends of said pair of sliders, said plate comprising a planar labelling surface and a plurality of labels on said labelling surface, each of said plurality of labels identifying at least one of the plurality of connectors;
   wherein said labelling plate is moveable about a first substantially horizontal pivot axis between a first position wherein said plate is opposite the front face, said labelling surface facing away from the plurality of connectors and substantially parallel to the first plane and each of said plurality of labels is opposite said at least one of the plurality of connectors and a second position where said plate is pivoted away from the front face and lies in said second plane thereby providing access to the plurality of connectors; and
   further wherein said plate is moveable from said second position to a third position where said plate is slid along said pair of sliders towards the front face.

2. The labelling system of claim 1, wherein said pair of sliders extends away from the front face by a distance sufficient to accommodate the cable, thereby spacing said labelling plate from the front face by said distance when said labelling plate is in said first position.

3. The labelling system of claim 1, further comprising a first pivot connection mounted between said labelling plate and said free ends of said pair of sliders for enabling rotation of said labelling plate about said first pivot axis.

4. The labelling system of claim 1, wherein in said third position said labelling plate rests on said pair of sliders.

5. The labelling system of claim 4, wherein said labelling plate is stored underneath the module by sliding said labelling plate further along a length of said pair of sliders.

6. The labelling system of claim 5, wherein said second plane spans a bottom surface of the module and is substantially perpendicular to the first plane.

7. The labelling system of claim 5, wherein the cable received into a corresponding one of the plurality of connectors extends away from the front face and towards a side of the module adjacent to a corresponding one of the rails for not impeding said sliding of said labelling surface underneath the module.

8. The labelling system of claim 1, further comprising a protective shield mounted adjacent said labelling plate about said first pivot axis, wherein when said labelling plate is in said third position, said shield is moveable about said first pivot axis to a position adjacent the front face for protecting said plurality of connectors.

9. The labelling system of claim 8, wherein when said labelling plate is in said first position, said shield is moveable about said first pivot axis to a position opposite the front face for protecting said labelling surface while enabling viewing of said plurality of labels therethrough.

10. The labelling system of claim 1, wherein in said second position said labelling surface is positioned towards the first plane and further wherein said labelling plate is moveable about a second substantially horizontal pivot axis substantially parallel to said first pivot axis between said second position and a fourth position where said labelling surface is facing away from the first plane.

11. The labelling system of claim 10, wherein said labelling surface is linearly moveable from said fourth position to a fifth position where said second pivot axis is aligned with said first pivot axis.

12. The labelling system of claim 11, further comprising a first pivot connection connected to said labelling plate for rotation about said first pivot axis and a second pivot connection connected to said labelling plate for rotation about said second pivot axis.

13. The labelling system of claim 12, wherein said first and said second pivot connections are selected from the group consisting of a pair of hinges, a pair of springs, a resilient pliable material, and a fold in said labelling plate.

14. The labelling system of claim 12, further comprising a pair of guide rails attached between corresponding ones of said first and said second pivot connections, wherein said second pivot connection is linearly moveable within said pair of guide rails for aligning said first and said second pivot axes.

15. The labelling system of claim 14, wherein each one of said pair of guide rails comprises a longitudinal slot extending along a length thereof for enabling said linear movement of said second pivot connection therewithin.

16. A method for labelling a patch panel mounted to a telecommunications rack comprising a pair of spaced vertical rails, the method comprising:
   providing a connector module mounted between the vertical rails, said module comprising a front face lying in a first plane and a plurality of connectors arranged along said front face for each terminating a cable;
   providing a pair of sliders attached at opposite sides of said module adjacent the rails, said pair of sliders extending away from said front face along a second plane intersecting said first plane along a substantially horizontal axis;
   providing a labelling plate comprising a planar labelling surface and a plurality of labels on said labelling surface, each of said plurality of labels identifying at least one of said plurality of connectors;
   mounting said labelling plate to free ends of said pair of sliders in front of said module;
   moving said labelling plate about a first substantially horizontal pivot axis between a first position wherein said plate is opposite said front face, said labelling surface facing away from said plurality of connectors and substantially parallel to said first plane and each of said plurality of labels is opposite said at least one of said plurality of connectors and a second position where said plate is pivoted away from said front face and lies in said second plane thereby providing access to said plurality of connectors; and
   moving said plate from said second position to a third position where said plate is slid along said pair of sliders towards said front face.

17. The method of claim 16, further comprising from said third position storing said labelling surface underneath said module by sliding said labelling plate further along a length of said pair of sliders.

18. The method of claim 16, further comprising spacing said labelling plate from said front face by a distance sufficient to accommodate said cable.

19. The method of claim 16, wherein in said second position said labelling surface is positioned towards said first plane and further comprising moving said labelling plate about a second substantially horizontal pivot axis substantially parallel to said first pivot axis between said second position and a fourth position where said labelling surface is facing away from said first plane.

20. The method of claim 19, further comprising linearly moving said labelling surface from said fourth position to a fifth position where said second pivot axis is aligned with said first pivot axis.

21. The method of claim 16, further comprising mounting a protective shield about said first pivot axis and moving said shield about said first pivot axis to a position adjacent said front face for protecting said labelling surface while enabling viewing of said plurality of labels therethrough when said labelling plate is in said first position and to a position adjacent said front face for protecting said plurality of connectors when said labelling plate is in said third position.

* * * * *